United States Patent
Noll et al.

(10) Patent No.: US 9,226,447 B2
(45) Date of Patent: Jan. 5, 2016

(54) END DIVIDER FOR A HEADER OF AN AGRICULTURAL HARVESTER

(71) Applicant: CNH America LLC, New Holland, PA (US)

(72) Inventors: Blaine Noll, Fleetwood, PA (US); Benjamin Ditchcreek, Orrstown, PA (US)

(73) Assignee: CNH Industrial America LLC, New Holland, PA (US)

( * ) Notice: Subject to any disclaimer, the term of this patent is extended or adjusted under 35 U.S.C. 154(b) by 119 days.

(21) Appl. No.: 14/069,873

(22) Filed: Nov. 1, 2013

(65) Prior Publication Data

US 2015/0121831 A1 May 7, 2015

(51) Int. Cl.
*A01D 63/00* (2006.01)
*A01D 63/04* (2006.01)
*A01D 41/14* (2006.01)

(52) U.S. Cl.
CPC .............. *A01D 63/04* (2013.01); *A01D 41/148* (2013.01)

(58) Field of Classification Search
CPC . A01D 41/14; A01D 41/1278; A01D 45/021; A01D 63/00; A01D 63/04; A01D 67/00; A01D 41/148
USPC ........... 56/119, 158, 181, 126, 208, 249, 314, 56/319
See application file for complete search history.

(56) References Cited

U.S. PATENT DOCUMENTS

| | | | |
|---|---|---|---|
| 179,930 A | 7/1876 | Lomgsworth | |
| 4,112,654 A | 9/1978 | Picha | |
| 4,215,527 A | 8/1980 | Shriver et al. | |
| RE31,063 E | 10/1982 | Greiner et al. | |
| 4,757,673 A | 7/1988 | Gayman | |
| 4,887,419 A | 12/1989 | Bouin | |
| 5,761,893 A | 6/1998 | Lofquist et al. | |
| 5,787,697 A | 8/1998 | Post | |
| 6,513,313 B1 | 2/2003 | Bennett | |
| 6,625,969 B2 | 9/2003 | Glazik | |
| 7,350,345 B2 * | 4/2008 | Slabbinck et al. | 56/119 |
| 7,380,392 B2 | 6/2008 | Willem et al. | |
| 7,827,775 B2 * | 11/2010 | Sethi | 56/314 |
| 2009/0282794 A1 | 11/2009 | Wilcox et al. | |

FOREIGN PATENT DOCUMENTS

DE 3407812 A1 10/1984

* cited by examiner

*Primary Examiner* — Robert Pezzuto
(74) *Attorney, Agent, or Firm* — Patrick M. Sheldrake

(57) ABSTRACT

End dividers are connected to a harvesting reel of a header such that fore and aft translational movement of the harvesting reel results in corresponding translation of a leading part of the end dividers. The end dividers may be secured to a header frame such that the end dividers float over uneven terrain. The end dividers can also include extensions or shrouds for receiving and protecting the ends of the reel, as well as sockets at their tips for releasably attaching various types of harvesting fixtures.

19 Claims, 4 Drawing Sheets

END DIVIDER FOR A HEADER OF AN AGRICULTURAL HARVESTER

BACKGROUND

The subject application relates generally to a header for use with agricultural harvesters. In particular, the subject application relates to a movable end divider for a header of a combine harvester.

The headers for agricultural harvesters, such as combines, that harvest crops may assume a variety of configurations depending on the crop being harvested. Regardless of the crop, however, harvester headers include at least a pair of crop dividers on opposite ends of a crop gathering mechanism. The end dividers serve to divide and lift the crop and guide it inwardly toward the crop gathering mechanism where it may be harvested and possibly further processed. In corn headers, for example, a plurality of intermediate dividers is typically used in conjunction with the end dividers in order to effectively harvest rows of corn. In other headers, such as those for harvesting wheat and other crops not normally grown in well-defined rows, the header is referred to as a draper header or auger header and includes a long spoked reel that works in conjunction with a knife to shear off and gather the crop.

Crops grow to varying heights and have other distinguishing physical characteristics. Taller plants typically require longer end dividers in order to divide the crop whereas shorter plants can normally be harvested using shorter end dividers. Heretofore, combine harvester headers use multiple differently-sized, fixed-length, detachable end dividers that are mounted to the headers to suit the type of crop being harvested. That is, when tall crops are harvested a pair of fixed-length long end dividers are attached to opposite ends of the header and, when it comes time to gather shorter crops, the long end dividers are replaced with shorter ones. Presently, therefore, the farmer who grows a variety of crops normally needs an assortment of differently-sized end dividers that must be physically attached to and detached from the header depending on the crop being harvested. Such a system is not only time and labor intensive but also requires the keeping of an inventory of end dividers which involves considerable expense and consumes valuable equipment storage space.

BRIEF SUMMARY

The subject application provides headers adapted for use with an agricultural harvester. The headers include improved end dividers that are secured to opposite ends of a harvesting reel and operate to deflect or divide the crop inwardly toward the harvesting reel. Unlike existing designs where the end dividers are detachably secured to the header, the end dividers of the subject application at all times remain on the header and adjust in length to suit the particular crop being harvested. The end dividers extend and retract based on forward and rearward movement of a harvesting mechanism, such as e.g., a harvesting reel and may comprise a single or multiple parts, such as, first and second parts where the second part moves telescopically with respect to the first part. In either case, the end dividers may be selectively adjusted lengthwise to suit the height and other characteristics of various types of crops. Thus, the subject header is capable of effectively harvesting crops of different heights without having to select and install crop specific end dividers to suit the crop or condition of crop being harvested.

In accordance with another aspect, the subject application provides a header adapted for use with an agricultural harvester. The header includes a frame connectable to an agricultural harvester, a harvesting reel rotatably carried by the frame and moveable in a vertical direction and in fore and aft directions, and an end divider assembly extending from a side end of the frame. The end divider assembly includes a first part and a second part in telescoping arrangement with the first part. The second part includes a front end and a rear end. The second part is connected to a side end of the harvesting reel and the front end of the second part is at a predetermined horizontal distance from a forward most end of the harvesting reel. In addition, the second part is coupled to the harvesting reel to move with the harvesting reel in the fore and aft directions to maintain the predetermined horizontal distance and to move independently of the harvesting reel when the harvesting reel moves in the vertical direction.

In accordance with yet another aspect, the subject application provides a header for an agricultural harvester. The header includes a frame connectable to a combine harvester, a harvesting reel rotatably carried by the frame and moveable in the vertical direction and in the fore and aft directions, and an end divider extending from a side end of the frame and moveable between a first position and a second position. The end divider includes a front end and a rear end. The front end is connected to a side end of the harvesting reel such that the front end is at a predetermined horizontal distance from a forward most end of the harvesting reel. The end divider is coupled to the harvesting reel to move with the harvesting reel in the fore and aft directions to maintain the predetermined horizontal distance and to move independently of the harvesting reel when the harvesting reel moves in the vertical direction.

In accordance with yet another aspect, the subject application provides a method of changing a length of an end divider of an agricultural harvester. The method includes automatically moving an end divider of a header via a telescopic arrangement, the moving act being parallel to a direction of motion of an agricultural harvester that hosts the end divider. The method further includes changing a length of the end divider based on the moving act.

An advantage of headers and end dividers constructed according to the subject application is that the extendable and retractable end dividers can quickly and easily replicate the lengths of conventional fixed length end dividers. This feature eliminates the need for maintaining an inventory of differently sized end dividers to accommodate crops of differing heights and other characteristics. Consequently, there results savings in end divider installation time, inventory cost, and equipment storage space. Furthermore, since the lengths of the end dividers of the subject application may be adjusted in a matter of seconds, overall harvesting efficiency and productivity are greatly improved.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
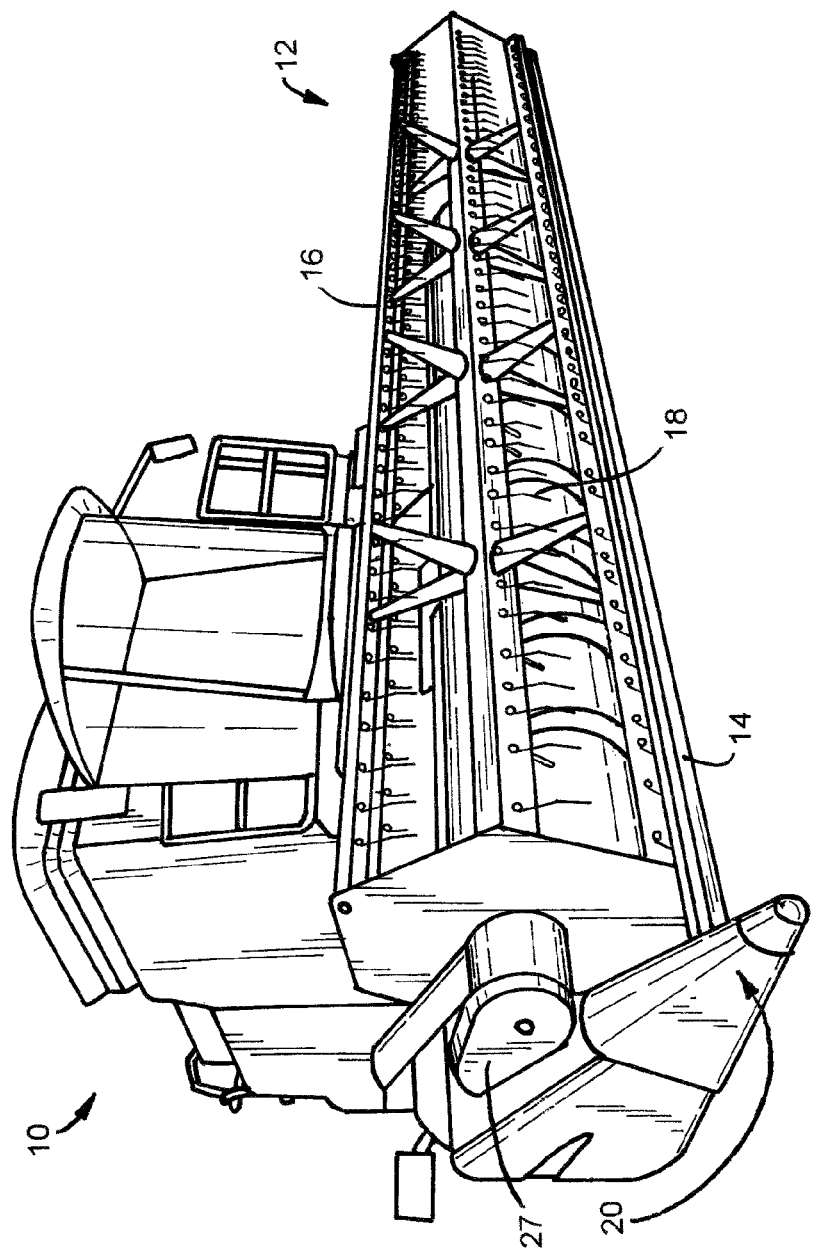
FIG. 1 is a perspective view of an agricultural combine including a header with end dividers according to the subject application.

Referring now to the drawings, wherein aspects of the subject application are shown, FIG. 1 illustrates an agricultural harvester in the form of a combine harvester 10 to which is attached a header 12. The header 12 has a crop cutter or knife assembly 14 arranged close the ground. The knife assembly includes a stationary blade and a reciprocating blade which together act as shears which cut the crop near the ground. A harvesting reel 16 having tines 18 rotates about a horizontal axis adjacent to the knife assembly 14 to gather the cut crop and feed it into the processing machinery of the harvester (not shown). An end divider assembly in accordance with the subject application is indicated at 20.

Figure 2:
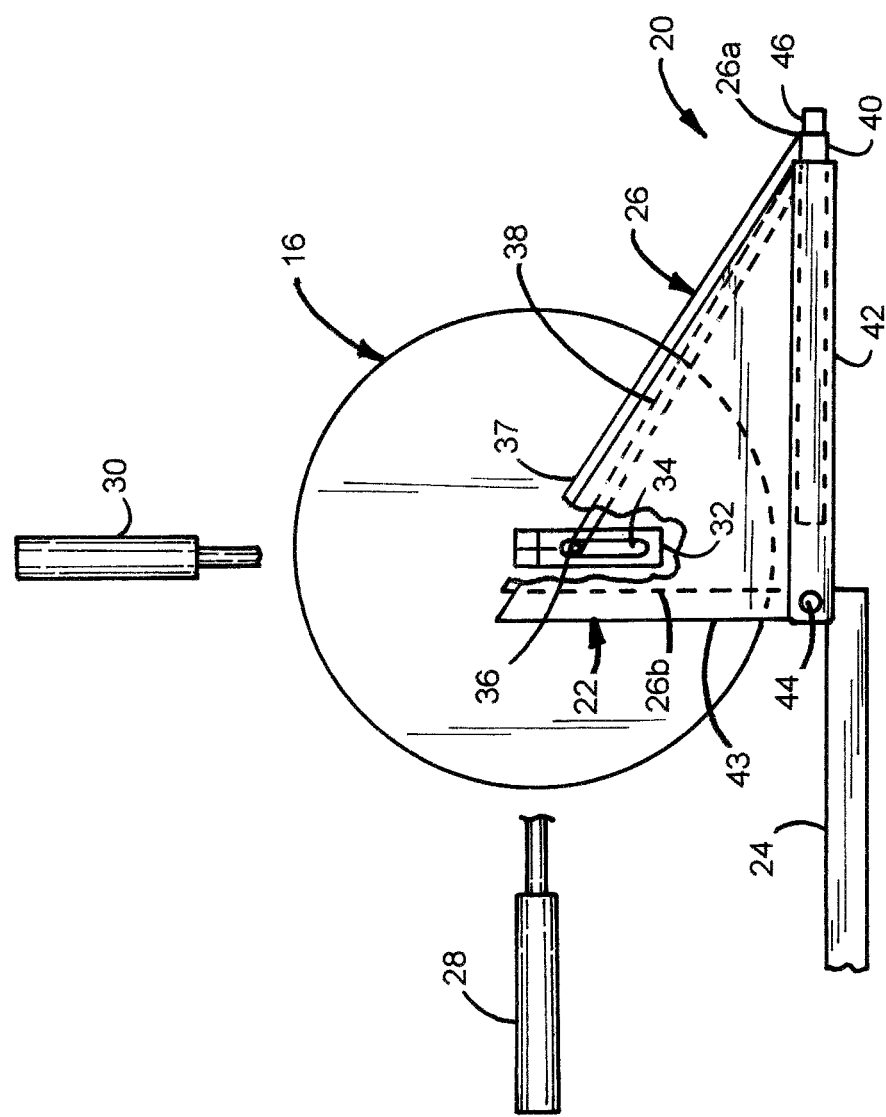
FIG. 2 is a partial schematic side elevation view of an end divider of the header of FIG. 1 with the end divider shown in a retracted state and including a partial cut away side view.
Figure 3:
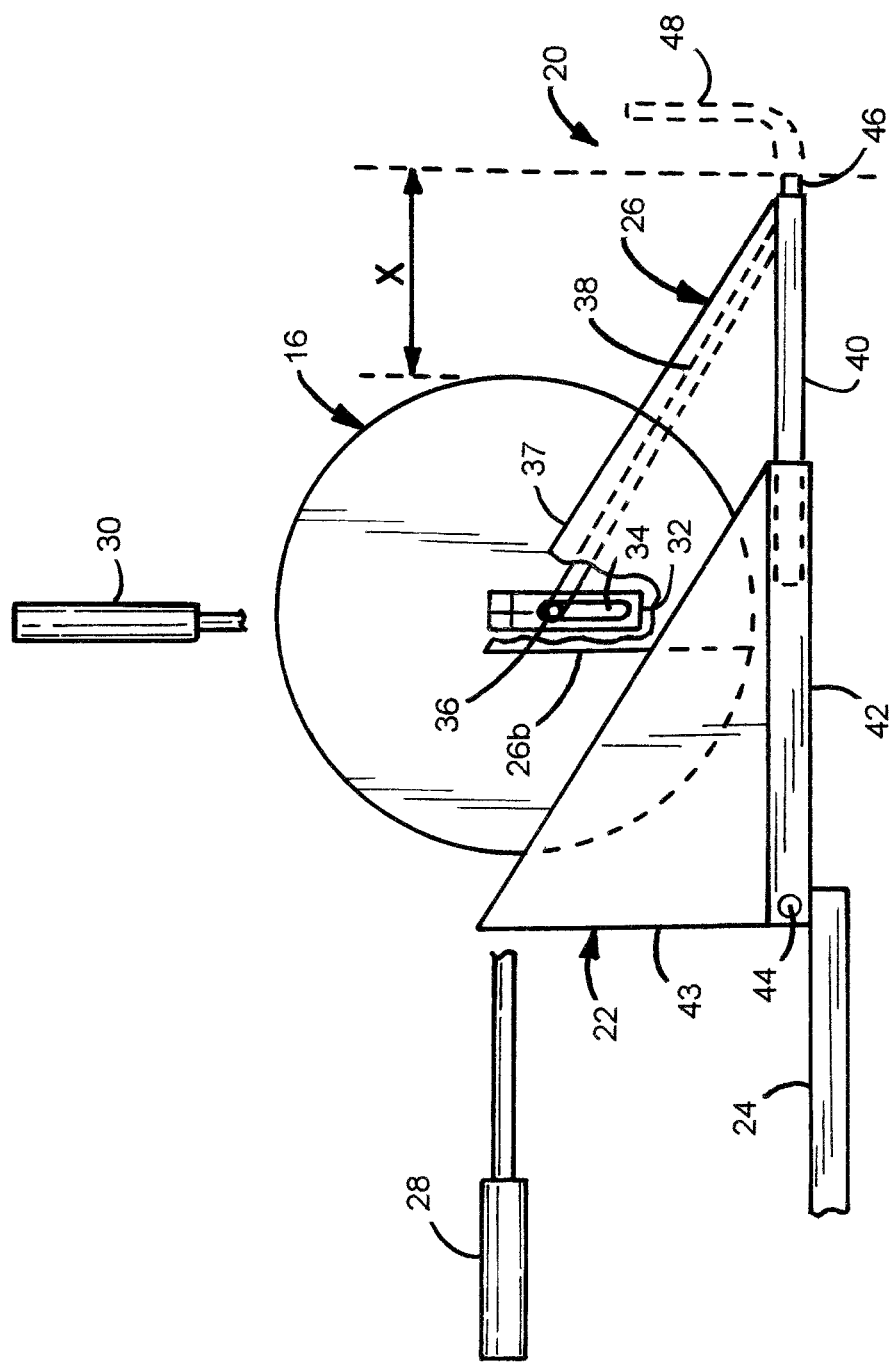
FIG. 3 is a partial schematic side elevation view of an end divider of the header of FIG. 1 with the end divider shown in an extended state and including a partial cut away side view.

Turning to FIGS. 2 and 3, the end divider assembly 20 according to a first aspect is of telescoping construction including a first section or first part 22 connected to a header frame 24 and a second section or second part 26 that is movably connected to the first part 22. The second part 26 has a front end 26a and a rear end 26b. The second part 26 is connected to a side end of the harvesting reel 16 as described below and the front end 26a of the second part is at a predetermined horizontal distance X (FIG. 3) from a forward most end of the harvesting reel.

As is known, header frame 24 is connectable to the combine harvester 10 and harvesting reel 16 is rotatably carried by the header frame 24. The harvesting reel 16 is rotated by a drive mechanism 27 (FIG. 1) which derives its power from the combine harvester.

The header includes devices 28 for moving the reel in a substantially horizontal fore and aft direction and similar devices 30 for moving the reel in a substantially vertical direction. Devices 28, 30 may be any suitable extendable and retractable devices, such as linear actuators including hydraulic or pneumatic cylinders, screw jacks, or the like. It can also be contemplated that the header, particularly if it is of a somewhat small size, can be moved manually in the fore and aft and up and down directions, e.g., without the assistance of linear actuators. The header further includes fixation or mounting devices for connecting the harvesting reel 16 to the second part 26 such that generally horizontal translational movement of the harvesting reel causes corresponding generally horizontal translational movement of the second part. Such devices also permit the harvesting reel 16 to be moveable in the vertical direction relative to the second part between a first position and a second position.

The devices connecting harvesting reel 16 and end divider 20 can include a male member 36 carried by one of a side end of the harvesting reel and the end divider, and a female slot 34 carried by the other of the side end of the harvesting reel and the end divider. Specifically, one of the second part and the side end of the harvesting reel includes the male member 36 and the other of the second part and the side end of the harvesting reel includes the female slot 34 for receiving the male member so as to be slidably engaged therewith. The female slot 34 receives the male member 36, which can be configured e.g., as a pin, so as to be slidably engaged therewith. Pin 36 is slidable in female slot 34 but is restrained by the slot in the horizontal direction.

By way of non-limiting example, FIGS. 2 and 3 depict a rigid mount 32 defining a substantially vertical female slot 34. The rigid mount 32 is operably connected to the harvesting reel 16 where forward extension of linear actuator 28 causes forward movement of the rigid mount 32, the harvesting reel 16 and the second part 26, and retraction of linear actuator 28 causes rearward movement of the rigid mount 32, the harvesting reel 16 and the second part 26. Pin 36, in turn, is connected to the second part 26 about the rear end 26b thereof. Alternatively, the pin 36 can be connected to the harvesting reel 16 and the female slot 34 connected to the second part 26.

The first part 22 is configured as shown schematically e.g., in FIGS. 2 and 3. In this particular aspect, the first part 22 is configured to have a generally hollow triangular shape or a hollow rectangular shape that tapers in a forward direction. Of course, the shape of the first part 22 can alternatively be any other shape capable of shielding a side of the header and functioning in a telescoping manner, as further discussed below.

The first part 22 is hingedly or pivotably connected or joined to the header frame 24 at pivot 44. In this way, the end divider may float over uneven terrain by virtue of the pivot 44 and the pin 36 freely sliding in slot 34. The first part also includes a generally horizontal second beam 42 integrally joined with a shell or body 43 of the first part 22. The horizontal second beam 42 telescopingly engages a corresponding first beam 40 of the second part 26, as further discussed below.

The second part 26 is configured as shown schematically e.g., in FIGS. 2 and 3. In this particular aspect, the second part 26 is shaped complementary to the first part 22 so as to easily stack onto the first part with little volumetric space there between when in a retracted or stacked configuration, as shown in FIG. 2. The second part 26 includes a shell or body 37 having a lateral side and a medial side, a rigid member 38, a generally horizontal first beam 40 and a quick connect attachment structure 46.

The rigid member 38 is affixed to the body 37 and moves therewith during extension and retraction of the second part. A front end of the rigid member 38 is connected to the generally horizontal first beam 40 which is integrally joined or connected with the body 37. A rear end of the rigid member 38 is connected to pin the 36. Thus, when the rigid mount 32 and the pin 36 received therein are moved forward or backward by operation of linear actuator 28, the rigid member 38 exerts a corresponding pushing or pulling force on the second part 26 thereby causing extension or retraction of the second part 26 relative to the first part 22. In order to ensure stable movement of the second part 26 relative to first part 22, first beam 40 is slidably received in (or can slidably surround) second beam 42 so as to be telescopingly connected.

The male member and female slot arrangement of the first and second parts enable the harvesting reel 16 to be moved up and down by linear actuator 30 when such may be desired or necessary to achieve optimal harvesting of a given crop. For example, the second part 26 is coupled to the harvesting reel 16 to move with the harvesting reel in the fore and aft directions to maintain the predetermined horizontal distance X of the front end 26a of the second part from the forward most end of the harvesting reel and to move independently of the harvesting reel when the harvesting reel moves in the vertical direction.

As seen in FIGS. 1-3, the first and second parts 22, 26 of the end divider 20 may be substantially triangular in shape and hollow, although they may assume any other shape that would be beneficial to harvesting a variety and different heights of crops. Additionally, it will be understood that while the end divider thus far described is of two-part construction, it is not limited to such a design. More particularly, the end divider may be constructed as a single part 120 (FIG. 4) which is connected to and moves in concert with the harvesting reel 16 in the manner described above while sliding in and out of a shroud 121 formed in the header.

In accordance with a further aspect of the subject application, the forward tip or front end of the second part includes a socket or similar quick connect 46 for releasably attaching harvesting fixtures or tools such as points, rods, or loops (one of which is shown in phantom line and designated by reference numeral 48 in FIG. 3) depending on crop requirements and operator preference. It can also be contemplated that additional long divider attachments could be attached to the quick connect 46 when it is desired to use the header to harvest crops such as field peas and canola which are typically fields of long tangled stalks and vines.

Figure 4:
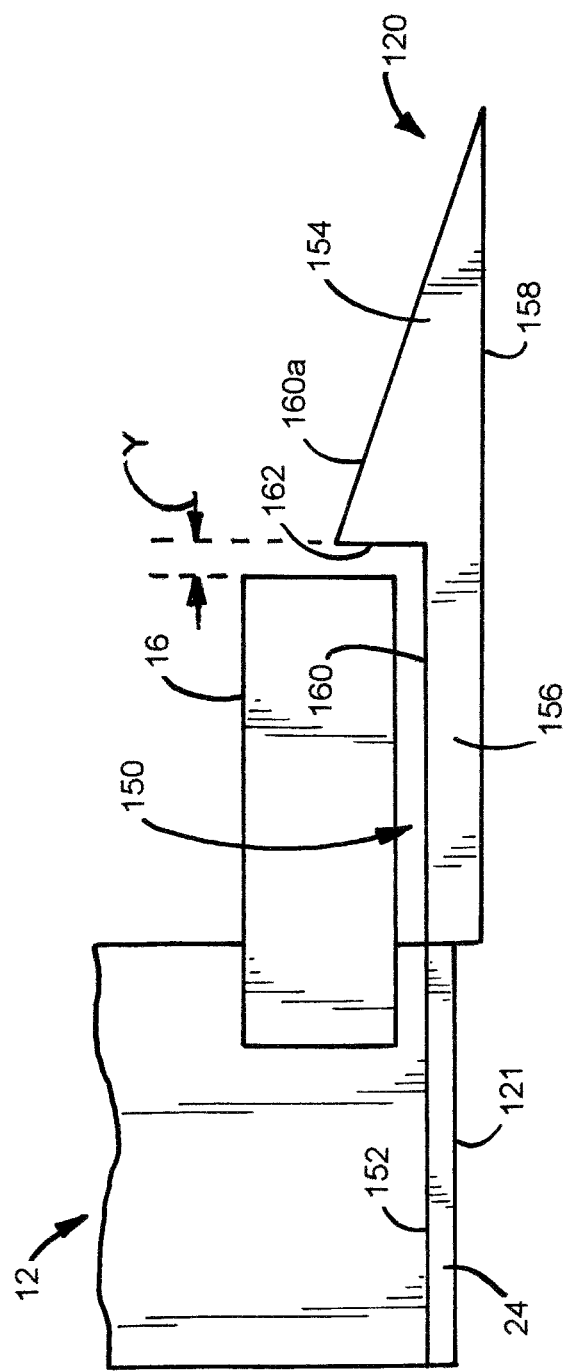
FIG. 4 is a partial schematic top plan view of an end of a header according to a further aspect of the subject application.

Referring to FIG. 4, there is illustrated a further aspect of the subject application. In particular, FIG. 4 is a partial plan view of a portion of a header 12, which includes a header frame 24, a harvesting reel 16 and an end divider 120. As seen in FIG. 4, the end divider 120 is spaced from the harvesting reel 16 so as to define a pocket or void 150. This void 150 can accumulate harvesting debris and material adversely affecting the operation of the harvester. In conventional headers, such crop material lodgment prevents the harvester knife assembly from making a clean crop cut. For example, crop material collects at the interface between the harvesting reel and the side of the header creating an obstruction that tends to encumber the crop dividing and gathering effects of the end divider. Consequently, some crop is left in the field and the harvest is less than optimal.

Still referring to FIG. 4, the front end of the end divider 120 is a tapered section 154 and the rear end 156 of the end divider 120 is an elongated section covering a lateral side of the harvesting reel 16. The elongated section 156 of the end divider covers the lateral side of the harvesting reel when the end divider 120 is moved between first and second positions. In addition, a fixed spatial distance Y is maintained between a forward most end of the harvesting reel 16 and the end divider 120 as the end divider is moved between first and second positions. Alternatively, a fixed void space is maintained between a forward most end of the harvesting reel and the shroud 162. End divider 120 includes a lateral side 158, a medial side 160, and a shroud or extension 162 that covers the void 150 about a portion of the anterior end of the harvesting reel. The shroud 162 is formed from a portion of the front end of the end divider 120 extending medially from the medial side 160 of the front end towards the harvesting reel 16.

In particular, the shroud 162 is formed from a front portion 160a of the medial side 160 having an extension that extends in a medial direction towards the harvesting reel 16. So constructed and arranged the shroud 162 reduces the likelihood of crop material collecting in the void 150 between the harvesting reel 16 and the side 152 of the header. As a result, the crop dividing and gathering function of the end divider is essentially unhindered, clean crop cuts are maintained during operation of the harvester, and crop recovery is correspondingly improved.

All other aspects of the end divider 120 are similar to those of end divider 20 discussed above, such as the end divider 120 being pivotably connected to the frame, the harvesting reel being configured to be moveable in the vertical direction relative to the end divider between a first position and a second position, the male and female members, and the quick connect.

This particular configuration of the end divider 120 having a shroud can similarly be applied to the end divider assembly 20 described above. In the end divider assembly 20, the second part 26 of the end divider assembly further includes a shroud covering the void about a portion of an anterior end of the harvesting reel. The shroud is formed from a portion of the front end 26a extending medially from a medial side of the front end. For example, the medial side includes an extension that extends in a medial direction towards the harvesting reel forming the shroud covering the void about a portion of the anterior end of the harvesting reel.

Regardless of the particular construction of the end divider, a further aspect of the invention involves an advantageous method of changing a length of an end divider to accommodate varying crop conditions as the crop is being harvested. The method includes automatically moving an end divider of a header via a telescopic arrangement. The telescopic arrangement can be, e.g., as described in the above end divider assembly. The moving act is parallel to a direction of motion of an agricultural harvester that hosts the end divider. The automatic feature of the end divider can be accomplished, e.g., by various electro-mechanical controls operatively connected to the end divider and a controller.

The method further includes changing a length of the end divider based on the moving act. For example, when the end divider is moved in a telescoping manner, the overall length of the end divider changes.

In performing the foregoing a method, the operator can automatically change the length of the divider to effectively and uninterruptedly harvest crop in situations where the height and/or density of the crop varies throughout a field being harvested. For example, the length of the end divider can be automatically changed when the harvesting reel of the header needs to be moved relative to the header frame to accommodate various crop conditions.

Furthermore, the method includes automatically maintaining a predetermined distance between the end divider and a frame of the header. This can be accomplished e.g., by a controller configured to move the end divider in a telescoping manner such that a front end of the end divider is maintained at a predetermined distance from a frame of the header or e.g., a specific location of a harvesting reel of the header.

The advantages of end dividers and headers constructed according to the subject application are many. Inventories of dividers are no longer needed since the extendable and retractable end dividers of the subject application can simulate the lengths of conventional fixed length end dividers and effectively deflect crops of varying height and conditions (e.g., standing, leaning or laying flat on the ground) without need for substitution of end dividers having differing lengths.

As a consequence, adjustment time, labor and equipment storage space are conserved while productivity is increased. In respect to other aspects, the dividers are able to float over uneven ground which allows the dividers to remain close to the ground during operation of the combine harvester where maximum amounts of crop can be lifted and guided to the header's crop gathering means. In still further aspects, the improved end dividers may be formed with pockets for protecting the ends of the reels and for keeping crop from clogging the header. According to still further aspects, the end dividers have quick connects for allowing an operator to releasably affix harvesting tools or other fixtures to the tips of the end dividers in order to optimize performance of the divider depending on needs, desires or conditions.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. An agricultural header, the header comprising:
a frame connectable to an agricultural harvester;
a harvesting reel rotatably carried by said frame and moveable in the vertical direction and in the fore and aft directions; and
an end divider assembly extending from a side end of the frame, the end divider assembly including:
a first part, and
a second part in telescoping arrangement with the first part, the second part having a front end and a rear end,
wherein the second part is connected to a side end of the harvesting reel and the front end of the second part is at a predetermined horizontal distance from a forward most end of the harvesting reel, and
wherein the second part is coupled to the harvesting reel to move with the harvesting reel in the fore and aft directions to maintain the predetermined horizontal distance and to move independently of the harvesting reel when the harvesting reel moves in the vertical direction.

2. The header of claim 1, wherein the first part is pivotably connected to the frame.

3. The header of claim 1, wherein the harvesting reel is moveable in the vertical direction relative to the second part between a first position and a second position.

4. The header of claim 1, wherein one of the second part and the side end of the harvesting reel includes a male member and the other of the second part and the side end of the harvesting reel includes a female slot for receiving the male member so as to be slidably engaged therewith.

5. The header of claim 1, wherein the front end of the second part includes a quick connect for releasably attaching a harvesting fixture.

6. The header of claim 1, wherein the end divider is spaced from the harvesting reel defining a void and the second part of the end divider assembly further comprises a shroud covering the void about a portion of an anterior end of the harvesting reel.

7. The header of claim 6, wherein the shroud is formed from a portion of the front end extending medially from a medial side of the front end.

8. The header of claim 6, wherein the second part further comprises:
a lateral side; and
a medial side having an extension that extends in a medial direction towards the harvesting reel forming the shroud covering the void about a portion of the anterior end of the harvesting reel.

9. An agricultural header comprising:
a frame connectable to an agricultural harvester;
a harvesting reel rotatably carried by the frame and moveable in the vertical direction and in the fore and aft directions; and
an end divider extending from a side end of the frame and moveable between a first position and a second position, the end divider including a front end connected to a side end of the harvesting reel such that the front end is at a predetermined horizontal distance from a forward most end of the harvesting reel,
wherein the end divider is coupled to the harvesting reel to move with the harvesting reel in the fore and aft directions to maintain the predetermined horizontal distance and to move independently of the harvesting reel when the harvesting reel moves in the vertical direction.

10. The header of claim 9, wherein the front end of the end divider is a tapered section and a rear end of the end divider is an elongated section covering a lateral side of the harvesting reel when the end divider is moved between first and second positions.

11. The header of claim 9, wherein the end divider is pivotably connected to the frame.

12. The header of claim 9, wherein the harvesting reel is moveable in the vertical direction relative to the end divider between a first position and a second position.

13. The header of claim 9, wherein one of the end divider and the side end of the harvesting reel includes a male member and the other of the end divider and the side end of the harvesting reel includes a female slot for receiving the male member so as to be slidably engaged therewith.

14. The header of claim 9, wherein the front end of the end divider includes a quick connect for releasably attaching a harvesting fixture.

15. The header of claim 9, wherein the end divider is spaced from the harvesting reel defining a void and the end divider comprises a shroud covering the void about a portion of an anterior end of the harvesting reel.

16. The header of claim 15, wherein the shroud is formed from a portion of the front end extending medially from a medial side of the end divider.

17. The header of claim 15, wherein the end divider further comprises:
a lateral side; and
a medial side having an extension extending in a medial direction towards the harvesting reel forming the shroud covering the void about a portion of the anterior end of the harvesting reel.

18. A method of changing a length of an end divider of an agricultural header having a harvesting reel, comprising:
automatically moving an end divider of the header via a telescopic arrangement in a direction generally parallel to a direction of motion of an agricultural harvester that hosts the end divider; the end divider extending from a side end of a frame of the header and moveable between a first position and a second position, the end divider including a first portion connected to the harvesting reel, and
changing a length of the end divider based on moving the end divider, wherein the end divider is moved in conjunction with the movement of the harvesting reel in at least one of the fore and aft directions.

19. The method of claim 18, further comprising automatically maintaining a predetermined distance between the end divider and a frame of the header.

\* \* \* \* \*